United States Patent
Yoshiizumi et al.

(10) Patent No.: US 9,660,506 B2
(45) Date of Patent: May 23, 2017

(54) ELECTRIC MOTOR HAVING A COMMUNICATION PASSAGE

(71) Applicant: HONDA MOTOR CO., LTD., Tokyo (JP)

(72) Inventors: Yusuke Yoshiizumi, Wako (JP); Junya Tachikawa, Wako (JP); Manabu Sakurada, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/276,058

(22) Filed: May 13, 2014

(65) Prior Publication Data
US 2014/0339934 A1  Nov. 20, 2014

(30) Foreign Application Priority Data

May 16, 2013 (JP) .................................. 2013-103788

(51) Int. Cl.
*H02K 9/00* (2006.01)
*H02K 9/19* (2006.01)
*H02K 5/20* (2006.01)

(52) U.S. Cl.
CPC .................. *H02K 9/19* (2013.01); *H02K 5/20* (2013.01)

(58) Field of Classification Search
CPC .................... H02K 9/00; F04C 29/02
USPC ...................... 310/52, 54, 58, 63
See application file for complete search history.

(56) References Cited

U.S. PATENT DOCUMENTS

| 2,888,193 | A | * | 5/1959 | Greenwald | .................... 417/370 |
| 4,645,429 | A | * | 2/1987 | Asami | .................... F04C 29/045 |
| | | | | | 417/312 |
| 4,781,542 | A | * | 11/1988 | Ozu et al. | ..................... 417/369 |
| 2009/0121562 | A1 | * | 5/2009 | Yim | ....................... H02K 9/19 |
| | | | | | 310/54 |
| 2009/0127954 | A1 | * | 5/2009 | Mogi | .................... B60K 17/12 |
| | | | | | 310/90 |
| 2012/0133222 | A1 | * | 5/2012 | Han et al. | ...................... 310/58 |

FOREIGN PATENT DOCUMENTS

| JP | 58-96219 U1 | 6/1983 |
| JP | 2003250248 A * | 9/2003 |
| JP | 2004-180376 | 6/2004 |
| JP | 2006-014438 | 1/2006 |
| JP | 2009-121553 | 6/2009 |

OTHER PUBLICATIONS

Japanese Office Action for corresponding JP Application No. 2013-103788, Aug. 16, 2016.

* cited by examiner

*Primary Examiner* — Jose Gonzalez Quinone
(74) *Attorney, Agent, or Firm* — Mori & Ward, LLP (57) ABSTRACT

An electric motor includes a housing, a rotor, a stator, a storage tank, and a communication passage. The stator has a stator core provided coaxially with the rotor to surround the rotor. The storage tank is provided at a lower portion of the housing to store lubricating oil and divided by the stator core into a first storage tank and a second storage tank. The communication passage is provided to communicate the first storage tank with the second storage tank. The communication passage, as seen in an axial direction, extends above an oil level of the lubricating oil stored in the first storage tank and the second storage tank such that an air flows between an upper portion of the first storage tank and an upper portion of the second storage tank.

16 Claims, 4 Drawing Sheets

ELECTRIC MOTOR HAVING A COMMUNICATION PASSAGE

CROSS-REFERENCE TO RELATED APPLICATIONS

The present application claims priority under 35 U.S.C. §119 to Japanese Patent Application No. 2013-103788, filed May 16, 2013, entitled "Electric Motor." The contents of this application are incorporated herein by reference in their entirety.

BACKGROUND

1. Field

The present disclosure relates to an electric motor.

2. Description of the Related Art

In conventional electric motors, lubricating oil is stored in the lower part of a housing which forms a motor chamber and a coil end of a stator is immersed in the oil so that the stator coil is cooled. Accordingly, the lower part of the housing may form a storage tank that stores the lubricating oil.

An inner space of the storage tank is separated by a stator core which is fixed at the center in the axial direction of the motor chamber so that the lubricating oil stored in the storage tank is divided into one side and the other side in the axial direction. In the following description, a portion of the tank formed by the storage tank (housing) and the stator core which stores the lubricating oil on one side with respect to the stator core in the axial direction is referred to as a first storage tank, while a portion of the tank which stores the lubricating oil on the other side in the axial direction is referred to as a second storage tank.

Japanese Unexamined Patent Application Publication No. 2009-121553 discloses an electric motor which includes a communication passage that communicates the first storage tank with the second storage tank. The communication passage allows the oil level of the lubricating oil in the first storage tank and the oil level of the lubricating oil in the second storage tank to be equal so that the coil end immersed in the oil in the first storage tank and the coil end immersed in the oil in the second storage tank are equally cooled.

SUMMARY

According to one aspect of the present invention, an electric motor includes a housing, a rotor, and a stator. The housing has a motor chamber which is an inner space. The rotor and the stator are disposed at a center in an axial direction of the motor chamber and separate the motor chamber into one side and the other side in the axial direction. A lower portion of the housing forms a storage tank that stores lubricating oil and cools a coil end of the stator. The storage tank and a stator core of the stator which is disposed at a center in an axial direction of the storage tank together form a first storage tank that stores the lubricating oil on one side in the axial direction with respect to the stator core and a second storage tank that stores the lubricating oil on the other side in the axial direction with respect to the stator core. A communication passage is provided to communicate the first storage tank with the second storage tank. The communication passage, as seen in the axial direction, extends above the oil level of the lubricating oil stored in the first storage tank and the second storage tank such that an air flow is allowed between an upper portion of the first storage tank and an upper portion of the second storage tank.

According to another aspect of the present invention, an electric motor includes a housing, a rotor, a stator, a storage tank, and a communication passage. The housing has a motor chamber which has an axial direction. The rotor is rotatably provided in the motor chamber and has a rotational axis substantially parallel to the axial direction. The stator has a stator core provided coaxially with the rotor to surround the rotor. The storage tank is provided at a lower portion of the housing to store lubricating oil and divided by the stator core into a first storage tank and a second storage tank. The communication passage is provided to communicate the first storage tank with the second storage tank. The communication passage, as seen in the axial direction, extends above an oil level of the lubricating oil stored in the first storage tank and the second storage tank such that an air flows between an upper portion of the first storage tank and an upper portion of the second storage tank.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

The embodiments will now be described with reference to the accompanying drawings, wherein like reference numerals designate corresponding or identical elements throughout the various drawings.

An electric motor of an embodiment of the present disclosure will be described with reference to FIGS. 1 to 4. This embodiment will be described using an example of the electric motor which is incorporated in a power unit for an electric vehicle.

Power Unit

Figure 1:
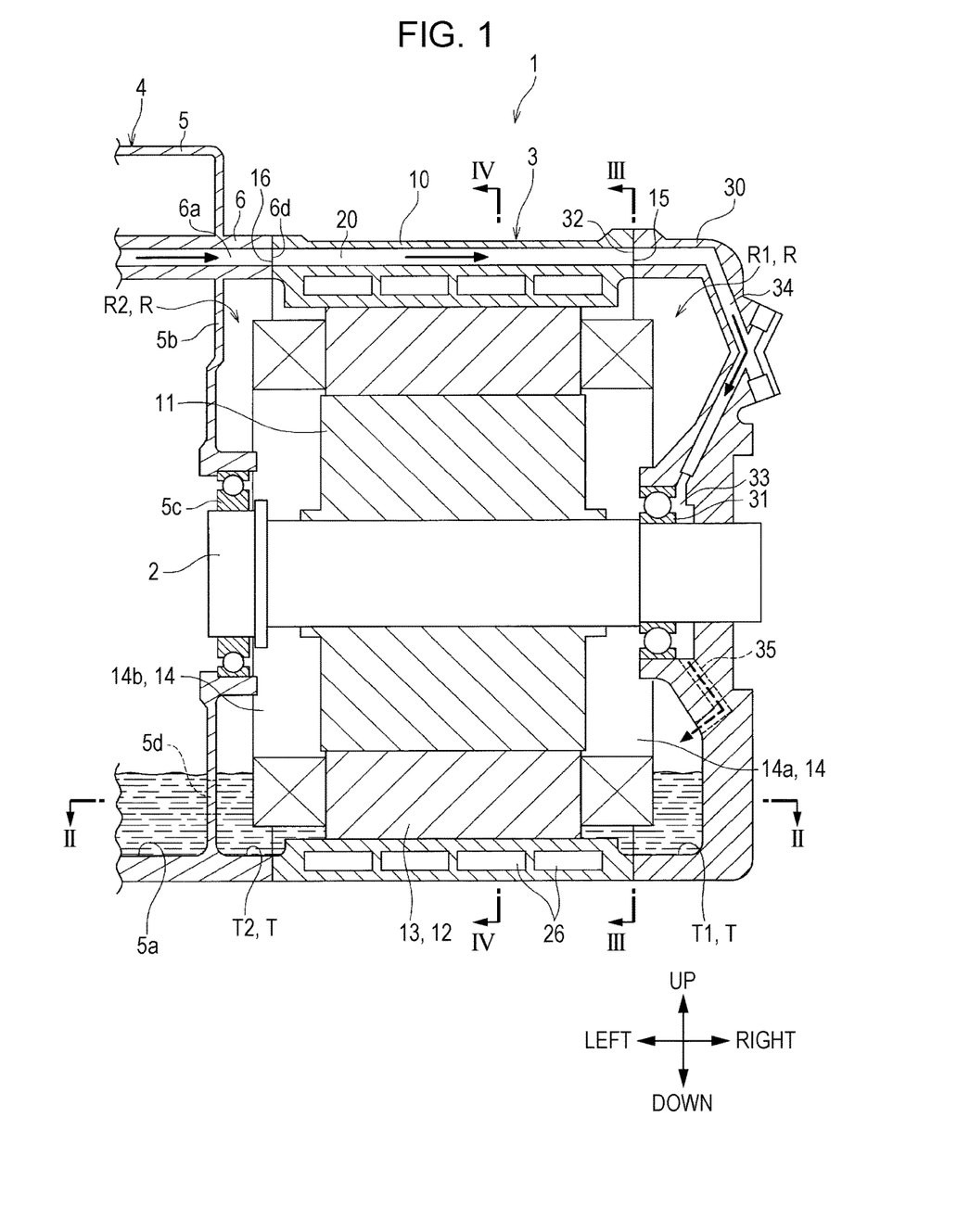
FIG. 1 is a sectional view of an electric motor (taken along the line I-I of FIG. 3) as seen from the back side according to an embodiment in which the electric motor is incorporated in a power unit.

A power unit 1 is a drive source that is mounted in an electric vehicle and converts an electric power into a rotational force and transmits the converted rotational force to a driving wheel so as to drive the electric vehicle. As shown in FIG. 1, the power unit 1 includes an electric motor 3 having a rotor shaft 2 which extends in the right and left direction and a gear box 4 which is disposed on the left side of the electric motor 3. In the power unit 1 of this embodiment, a center housing 10 which constitutes the electric motor 3 and a gear housing 5 which constitutes the gear box 4 are joined together by a bolt, which is not shown in the figure, such that the electric motor 3 and the gear box 4 are formed as an integral unit.

Gear Box

Although not shown in the figure, the gear box 4 includes a transmission mechanism composed of a plurality of gears and an input shaft which is connected to the left end of the rotor shaft 2 so as to transmit a rotation motion of the rotor shaft 2 to the transmission mechanism. The transmission mechanism decelerates the rotation motion of the rotor shaft 2 and transmits the decelerated rotation motion to a drive shaft. Further, although not shown in the figure, an oil passage and an oil pump are disposed in the gear box 4 so as to supply lubricating oil to a plurality of gears and the like.

Figure 2:
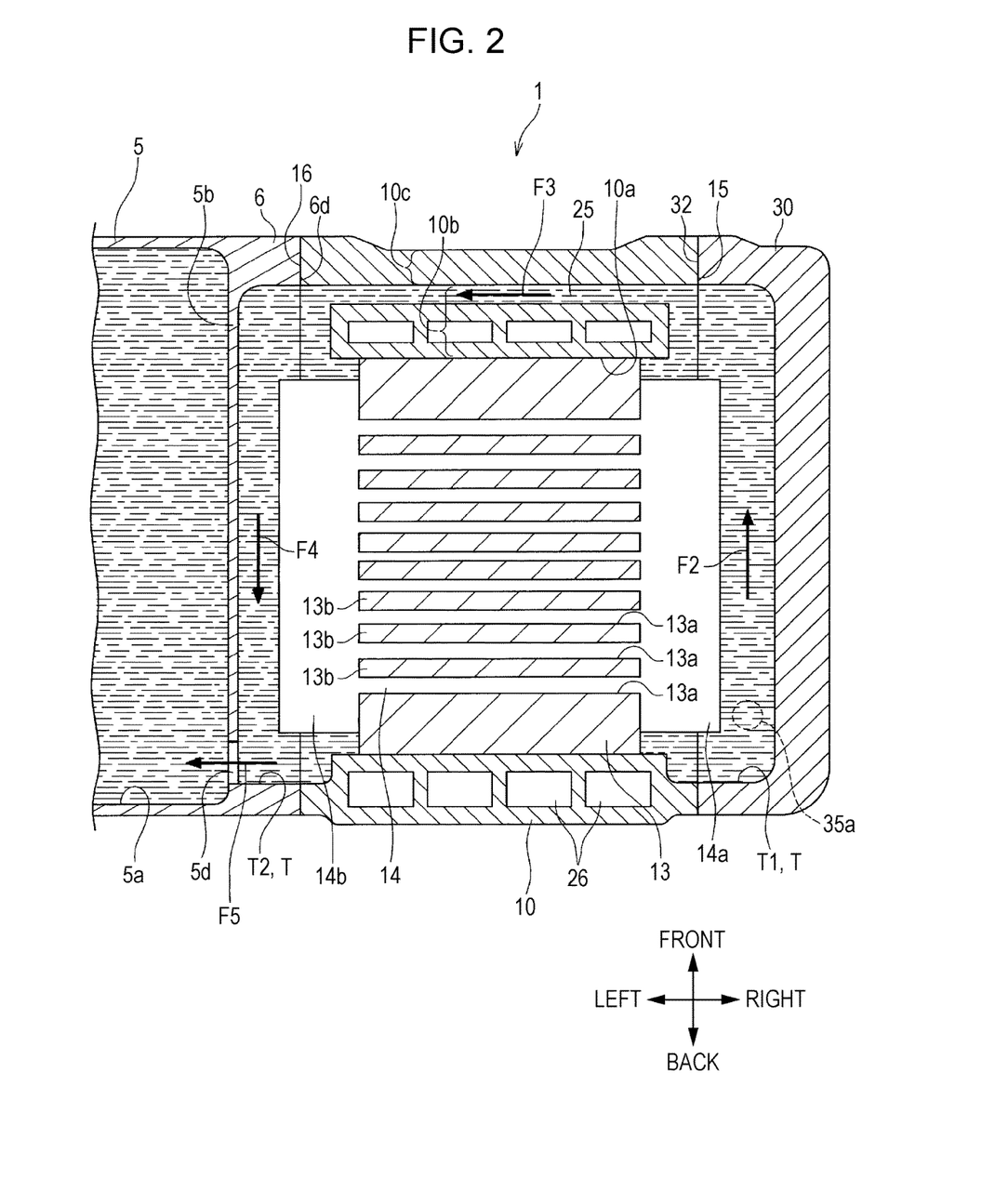
FIG. 2 is a sectional view taken along the line II-II of FIG. 1 as seen from above.

The gear housing 5 which constitutes the gear box 4 is a box-shaped cast made by die casting. As shown in FIGS. 1 and 2, a lower part of the gear housing 5 forms an oil storage tank 5a which stores lubricating oil to be pumped up by an oil pump, which is not shown in the figure, and supplied to a plurality of gears and the like.

In this embodiment, the gear housing 5 and the center housing 10 are joined by a bolt such that a right wall 5b of the gear housing 5 closes the left opening of the cylindrical center housing 10. As shown in FIG. 1, an annular ball bearing 5c is disposed on the right wall 5b of the gear housing 5 to rotatably support the left end of the rotor shaft 2.

Further, an annular section 6 which is formed in a substantially annular shape and extends to the right is disposed on the right wall 5b of the gear housing 5, and the right end face (hereinafter, referred to as a "mating surface 6d") of the annular section 6 abuts against a left mating surface 16 of the center housing 10. A first supply passage 6a which is formed as a hole that penetrates the mating surface 6d of the annular section 6 and communicates with an oil passage in the gear housing 5, which is not shown in the figure, is disposed on the upper part of the annular section 6. In addition, as shown in FIGS. 1 and 2, a suction passage 5d that penetrates in the right and left direction is disposed on the lower part of the right wall 5b of the gear housing 5. The suction passage 5d will be described later in detail.

Electric Motor

The electric motor 3 converts an electric energy into a rotation motion of the rotor shaft 2. As shown in FIG. 1, the electric motor 3 includes the rotor shaft 2, the cylindrical center housing 10 which is secured to the gear housing 5, a rotor 11 and a stator 12 disposed at the center in the right and left direction of inside of the center housing 10, and a side housing 30 formed in a substantially disk shape and disposed on the right side of the center housing 10.

Center Housing

The center housing 10 is a cast made by die casting in a substantially cylindrical shape which opens to the right and left. The openings on the right and left sides of the center housing 10 are closed by the side housing 30 and the right wall 5b of the gear housing 5, respectively, such that an inner space of the center housing 10 serves as a motor chamber R which houses the rotor 11 and the stator 12. In this embodiment, the housing formed by the center housing 10, the gear housing 5 and the side housing 30 corresponds to the "housing" defined in claims.

Storage Tank

Further, the lower part of the housing which is formed by the center housing 10, the gear housing 5 and the side housing 30 serves as a storage tank T that stores the lubricating oil. A stator core 13, which will be described later, is disposed at the center in the right and left direction of the motor chamber R so as to separate the storage tank T into the right and left sides. Accordingly, the storage tank T (lower part of the housing) and the stator core 13 together form a first storage tank T1 that stores the lubricating oil on the right side of the stator core 13 and a second storage tank T2 that stores the lubricating oil on the left side of the stator core 13. Further, a portion of the motor chamber R which is located above the first storage tank T1 is referred to as a first motor chamber R1, while a portion of the motor chamber R which is located above the second storage tank T2 is referred to as a second motor chamber R2.

As shown in FIG. 2, the first storage tank T1 formed by the storage tank T and the stator core 13 extends in the front and back direction in plan view, and the second storage tank T2 also extends in the front and back direction in plan view. In addition, the back side of the second storage tank T2 communicates with the oil storage tank 5a via the suction passage 5d which is disposed on the right wall 5b of the gear housing 5. Accordingly, the circulation oil stored in the second storage tank T2 returns to the oil storage tank 5a through the back side of the second storage tank T2 via the suction passage 5d.

Figure 3:
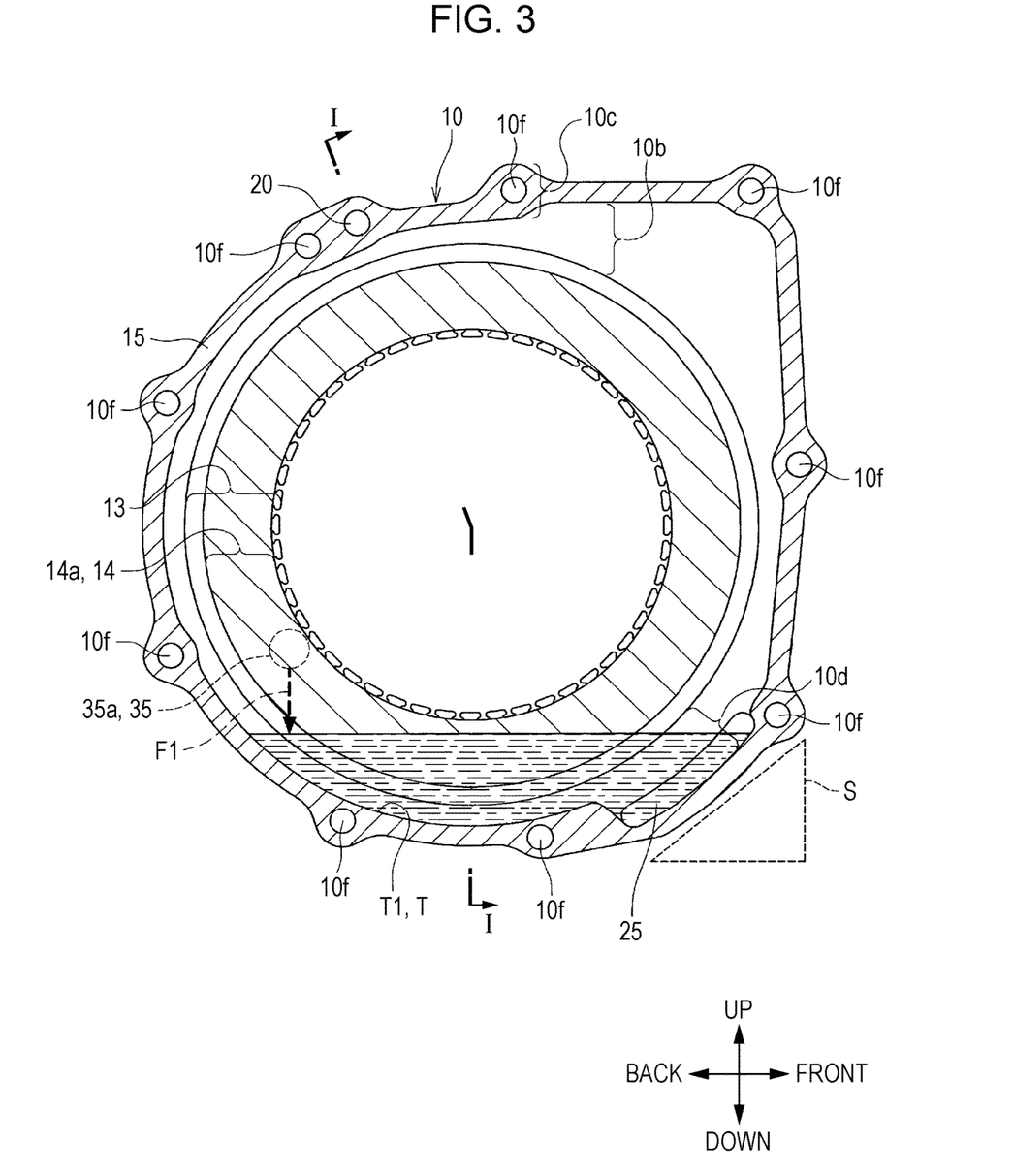
FIG. 3 is a sectional view taken along the line III-III of FIG. 1 as seen from the right side.

Next, a detailed configuration of the center housing 10 will be described. As shown in FIG. 3, the center housing 10, as seen in the axial direction, includes an annular inner periphery 10b on which the stator 12 press-fits and an annular outer periphery 10c which surrounds the inner periphery 10b.

As shown in FIG. 2, the outer periphery 10c extends in the right and left direction over the inner periphery 10b, and the right and left end faces abut against a mating surface 32 of the side housing 30 and a mating surface 6d of the gear housing 5, respectively. The left end face of the outer periphery 10c is referred to as a left mating surface 16, while the right end face of the outer periphery 10c is referred to as a right mating surface 15.

Further, as shown in FIG. 1, a second supply passage 20 is formed as a substantially straight hole that penetrates the outer periphery 10c between the right mating surface 15 and the left mating surface 16. The left end of the second supply passage 20 is connected to the first supply passage 6a of the gear housing 5 so that the lubricating oil flows to the right side of the center housing 10, thereby cooling the members and components disposed on the right side of the center housing 10. As shown in FIG. 3, the second supply passage 20 is disposed on the back side with respect to the center axis as seen in the axial direction (see FIG. 3). Accordingly, the height of the center housing 10 is reduced compared with the case where the second supply passage 20 overlaps the center axis in the up and down direction. In addition, a plurality of fixing holes 10f are disposed on the right mating surface 15 with a space therebetween in the circumferential direction so that bolts are threaded into the fixing holes 10f to secure the side housing 30.

Next, the inner periphery 10b of the center housing 10 will be described. As shown in FIG. 3, the annular inner periphery 10b includes a thick wall section 10d which has an increased thickness extending radially outward at the lower front portion as seen in the axial direction. A communication hole 25 is formed to penetrate the lower front portion of the inner periphery 10b. As shown in FIG. 2, the communication hole 25 extends in the right and left direction and communicates the front side of the first storage tank T1 and the front side of the second storage tank T2. Accordingly, the communication hole 25, the first storage tank T1 and the second storage tank T2 are continuous and form a substantially U-shape as seen from the above. Further, as shown in FIG. 3, the communication hole 25 is formed in arc shape as seen in the axial direction and extends above the oil level of the lubricating oil. As a consequence, the lubricating oil flows from the first storage tank T1 to the second storage tank T2 at the lower part of the communication hole 25, and an air flows between the first motor chamber R1 and the second motor chamber R2 at the upper part of the communication hole 25.

Figure 4:
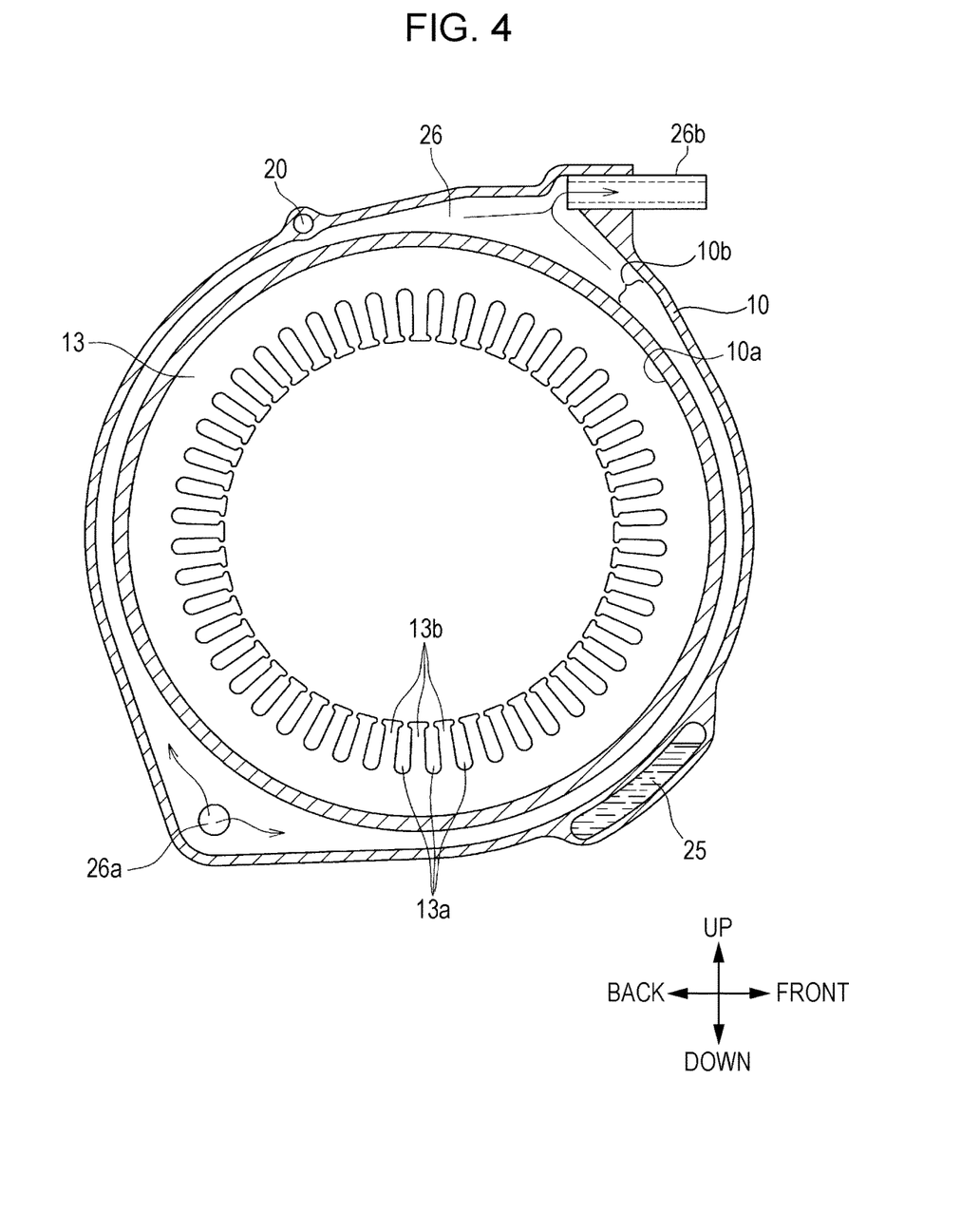
FIG. 4 is a sectional view taken along the line IV-IV of FIG. 1 as seen from the right side.

As shown in FIG. 4, a substantially annular cooling water passage 26 is formed in the center housing 10. The cooling water passage 26 is an annular water channel which surrounds the outer periphery of the stator core 13 as seen in the axial direction, and the cooling water is supplied to the cooling water passage 26 to cool the stator core 13. Further, a water injection port 26a that penetrates in the axial direction to communicate with the cooling water passage 26 is formed at the lower back portion of the center housing 10 and a water discharge port 26b that communicates the cooling water passage 26 with the outside of the center housing 10 is formed at the upper front portion of the center housing 10. The cooling water is supplied from the water injection port 26a to the lower portion of the cooling water passage 26 so that the cooling water flows annularly along the cooling water passage 26 and moves upward while cooling the outer periphery of the stator core 13. Further, the cooling water which has been moved upward in the cooling water passage 26 is discharged through the water discharge port 26b along with an air generated from the cooling water when being heated by the stator core 13. Further, the cooling water passage 26 is formed radially inside with respect to the communication hole 25. Accordingly, the heat of the stator core 13 is blocked by the cooling water passage 26 so that the lubricating oil which flows in the communication hole 25 is not heated.

Next, the stator 12 and the rotor 11 will be described. Although not shown in the figure, the rotor 11 includes a plurality of steel plates which are secured to the rotor shaft 2 and permanent magnets which are disposed between a plurality of steel plates so that the rotor 11 rotates by a rotating magnet field generated by the stator 12. In FIGS. 2 to 4, the rotor 11 and the rotor shaft 2 are omitted.

As shown in FIG. 1, the stator 12 includes the annular stator core 13 which is press-fit on the inner peripheral surface 10a of the center housing 10 and a stator coil 14 which is wound around the stator core 13.

Further, as shown in FIG. 4, notches 13a which are recessed radially outward and teeth 13b which protrude radially inward are alternately arranged on the inner periphery of the stator core 13 as seen in the axial direction. As shown in FIG. 2, the notches 13a and the teeth 13b extend in the right and left direction. A stator coil 14 is formed by winding a lead wire around the teeth 13b through the notches 13a. When the stator coil 14 is formed, coil ends 14a, 14b which are formed by the lead wire extending from the right and left end faces of the stator core 13 (the turning portion of the wound lead wire).

As shown in FIG. 3, the lower end of the right coil end 14a is immersed in the lubricating oil stored in the first storage tank T1 and is cooled by the lubricating oil stored in the first storage tank T1. On the other hand, the lower end of the left coil end 14b is immersed in the lubricating oil stored in the second storage tank T2 as shown in FIG. 1 and is cooled by the lubricating oil stored in the second storage tank T2.

Next, the side housing 30 will be described. As shown in FIG. 1, the side housing 30 is a substantially disc-shaped cast made by die casting. The side housing 30 is tightened by the bolts which are screwed into the fixing holes 10f (see FIG. 3) and secured to the right side of the center housing 10 so that the opening on the right side of the center housing 10 is closed by the side housing 30. The annular ball bearing 31 is disposed at the center of the side housing 30 to rotatably support the left end of the rotor shaft 2. The side housing 30 includes an annular storage chamber 33 that stores the lubricating oil on the right side of the ball bearing 31.

Further, a third supply passage 34 that penetrates the mating surface 32 which abuts against the right mating surface 15 of the center housing 10 is formed in the side housing 30 so as to be connected to the storage chamber 33. The third supply passage 34 corresponds to the second supply passage 20 which is formed on the right mating surface 15 on the right side of the opposing center housing 10 such that the lubricating oil in the second supply passage 20 flows into the storage chamber 33 and is supplied to the ball bearing 31 and the rotor shaft 2. The lubricating oil supplied to the ball bearing 31 flows into the motor chamber R through the ball bearing 31 and into the first storage tank T1.

Further, a fourth supply passage 35 which extends downward from the storage chamber 33 is formed in the side housing 30. The fourth supply passage 35 is an oil passage which allows the lubricating oil which flows from the third supply passage 34 through the storage chamber 33 to be supplied to the first storage tank T1. Accordingly, a relatively large amount of lubricating oil is supplied to the first storage tank T1. As shown in FIG. 3, the supply port 35a of the fourth supply passage 35 is located above the oil level of the lubricating oil stored in the first storage tank T1. This prevents the lubricating oil in the first storage tank T1 from flowing into the fourth supply passage 35. Moreover, even if the oil pressure in the fourth supply passage 35 decreases, the lubricating oil flows into the first storage tank T1 due to the weight of the lubricating oil itself. Further, the supply port 35a of the fourth supply passage 35 is disposed at a position close to the back side of the side housing 30 such that the lubricating oil flowing from the supply port 35a is supplied to the back side of the first storage tank T1.

Next, a flow of the lubricating oil (oil passage) which flows in the electric motor 3 of the power unit 1 will be described with reference to FIGS. 1 to 3. As shown in FIG. 1, the lubricating oil which is fed by the oil pump flows through the first supply passage 6a of the gear housing 5 and is supplied to the second supply passage 20 of the center housing 10. The lubricating oil flows from the second supply passage 20 through the third supply passage 34 into the storage chamber 33, and then, part of the lubricating oil stored in the storage chamber 33 is supplied to the ball bearing 31 and the rotor shaft 2. The lubricating oil in the storage chamber 33 flows through the fourth supply passage 35 and is supplied to the first storage tank T1.

As shown in FIG. 3, since the supply port 35a of the fourth supply passage 35 is disposed on the back side of the first storage tank T1, the lubricating oil which flows from the supply port 35a flows into the back side of the first storage tank T1 (see the arrow F1 in FIG. 3).

In the case where the lubricating oil is supplied to the first storage tank T1 through the fourth supply passage 35, the oil pump suctions the lubricating oil in the oil storage tank 5a. Accordingly, the lubricating oil in the oil storage tank 5a decreases and the lubricating oil in the second storage tank T2 flows into the oil storage tank 5a via the suction passage 5d.

Since the suction passage 5d is disposed on the back side of the second storage tank T2, the lubricating oil stored in the back side of the second storage tank T2 flows into the oil storage tank 5a (see the arrow F5 in FIG. 2). As a consequence, the lubricating oil in the second storage tank T2 flows from the front side to the back side (see the arrow F4 in FIG. 2). Further, the front side of the second storage tank T2 communicates with the front side of the first storage tank T1 via the communication hole 25. Accordingly, when the oil pump suctions, the circulation oil stored in the first storage tank T1 flows into the front side of the second storage tank T2 (see the arrow F3 in FIG. 2). In the first storage tank T1, the lubricating oil flows from the back side where the lubricating oil is supplied to the front side (see the arrow F2 in FIG. 2). Accordingly, when the oil pump suctions, the lubricating oil flows in a substantially U-shape in plan view (see F2 to F5 in FIG. 2).

Further, a large amount of lubricating oil is supplied from the fourth supply passage 35 to the back side of the first storage tank T1 as described above. Accordingly, the oil level of the lubricating oil stored in the first storage tank T1 becomes higher than the oil level of the lubricating oil stored in the second storage tank T2 and the oil storage tank 5a so that the lubricating oil in the first storage tank T1 flows into the second storage tank T2, and then into the oil storage tank 5a. That is, the lubricating oil supplied from the fourth supply passage 35 flows from the back side to the front side of the first storage tank T1 (see the arrow F2 in FIG. 2), flows through the communication hole 25 (see the arrow F3 in FIG. 2), flows from the front side to the back side of the second storage tank T2 (see the arrow F4 in FIG. 2), and then flows from the back side of the second storage tank T2 into the oil storage tank 5a (see the arrow F5 in FIG. 2). Accordingly, when the lubricating oil is supplied from the fourth supply passage 35, the lubricating oil flows in a substantially U-shape in plan view (see F2 to F5 in FIG. 2).

According to the foregoing oil passage, the lubricating oil ejected from the oil pump continuously flows through the supply passages (the first supply passage 6a, the second supply passage 20, the third supply passage 34, and the fourth supply passage 35), the first storage tank T1, the communication hole 25, the second storage tank T2, the suction passage 5d, and the oil storage tank 5a without being stagnated. Accordingly, the lubricating oil heated by the coil end 14a, 14b flows in a U-shape in plan view without being stagnated in the first storage tank T1 or in the second storage tank T2. As a result, the lubricating oil in the first storage tank T1 and the lubricating oil in the second storage tank T2 tend to have little difference in temperature, and the coil ends 14a, 14b immersed in the oil are uniformly cooled.

Further, the storage tank T (the first storage tank T1, the second storage tank T2) forms part of the oil passage which circulates the electric motor 3, and a flow toward the oil storage tank 5a is generated. Accordingly, a period of time in which the lubricating oil is stored in the storage tank T (the first storage tank T1, the second storage tank T2) is reduced, thereby improving the cooling efficiency to cool the coil ends 14a, 14b.

In the power unit 1 having the electric motor 3 according to this embodiment, the lubricating oil flows in the lower part of the communication hole 25, and an air flows in the upper part of the communication hole 25. Accordingly, the communication hole 25 serves as a vent port of the first motor chamber R1 and the second motor chamber R2, thereby ensuring a smooth flow of the lubricating oil in the communication hole 25 without being stagnated. This allows the amount of oil in the first storage tank T1 and the amount of oil in the second storage tank T2 to become equal and the coil ends 14a, 14b immersed in the oil can be equally cooled.

In the embodiment, since the communication hole 25 serves as a vent hole, an additional hole is not formed in the housing in addition to the communication hole, thereby eliminating a processing operation to form a vent port. Further, components for forming a vent port are not additionally provided, thereby avoiding the weight of the electric motor to be increased.

Moreover, in the embodiment, the communication hole 25 is disposed on the front side. Since the lubricating oil moves backward when the electric vehicle is inclined during climbing a slope, there is no risk that the communication hole 25 is filled with the lubricating oil and that an air flow is disturbed. As a result, in the case where high output is required during climbing a slope, an air flow is ensured through the communication hole 25 and the lubricating oil is ensured to flow through the communication hole 25 without being stagnated.

Further, in the embodiment, the thick wall section 10d of the inner periphery 10b in which the communication hole 25 is formed is provided by using a dead space S (see FIG. 3) of the electric motor 3, which is usually formed in a substantially circular shape as seen in the axial direction. Accordingly, even if the inner periphery 10b has a portion of increased thickness extending radially outward so as to provide the communication hole 25, a space for installing the electric motor 3 is not increased.

Although the electric motor 3 according to the embodiment has been described, the disclosure is not limited to the above embodiment. For example, although the supply port 35a of the fourth supply passage 35 according to the embodiment is disposed at a position above the oil level, it is not limited to, and the supply port 35a of the fourth supply passage 35 may be disposed at a position under the oil level.

According to an aspect of the embodiment of the present application, an electric motor includes a housing having a motor chamber which is an inner space; and a rotor and a stator which are disposed at a center in an axial direction of the motor chamber and separates the motor chamber into one side and the other side in the axial direction, wherein a lower portion of the housing forms a storage tank that stores lubricating oil and cools a coil end of the stator, the storage tank and a stator core of the stator which is disposed at a center in an axial direction of the storage tank together form a first storage tank that stores the lubricating oil on one side in the axial direction with respect to the stator core and a second storage tank that stores the lubricating oil on the other side in the axial direction with respect to the stator core, a communication passage is provided to communicate the first storage tank with the second storage tank, and the communication passage, as seen in the axial direction, extends above the oil level of the lubricating oil stored in the first storage tank and the second storage tank such that an air flow is allowed between an upper portion of the first storage tank and an upper portion of the second storage tank.

With this configuration, an air flow is allowed in an upper portion of the communication passage since the communication passage extends above the oil level of the stored lubricating oil. Accordingly, an air flow is allowed between the first motor chamber and the second motor chamber which are disposed above the first storage tank and the second storage tank, respectively, thereby avoiding stagnation of the lubricating oil in the communication passage. Further, the above communication passage eliminates the need of providing an additional vent hole in addition to the communication passage, and accordingly, a processing operation to form a vent hole is not necessary. The above communication passage also eliminates the need of providing additional components, thereby preventing the weight of the electric motor from being increased.

Further, it is preferable that the electric motor is mounted in a vehicle and the communication passage extends in the right and left direction on the front side of the vehicle.

With this configuration, the lubricating oil moves backward when the electric vehicle is inclined during climbing a slope. Accordingly, there is no risk that the communication passage which extends in the right and left direction on the front side of the vehicle is filled with the lubricating oil and that an air flow is disturbed. In the case where high output is required during climbing a slope, an air flow is ensured through the communication passage between the first motor chamber and the second motor chamber, thereby avoiding stagnation of the lubricating oil in the communication passage with certainty.

According to the above aspect of the embodiment of the present application, an electric motor that is capable of avoiding stagnation of the lubricating oil in the communication passage without increasing the weight of the electric motor and without providing an additional hole in addition to the communication passage can be provided.

Obviously, numerous modifications and variations of the present invention are possible in light of the above teachings. It is therefore to be understood that within the scope of the appended claims, the invention may be practiced otherwise than as specifically described herein.

What is claimed is:

1. An electric motor comprising:
a rotor shaft;
a housing having a motor chamber which is an inner space; and
a rotor and a stator which are disposed at a center in an axial direction of the motor chamber and separate the motor chamber into one side and the other side in the axial direction, wherein a lower portion of the housing forms a storage tank that stores lubricating oil and cools a coil end of the stator, the storage tank and a stator core of the stator which is disposed at a center in an axial direction of the storage tank together form a first storage tank that stores the lubricating oil on one side in the axial direction with respect to the stator core and a second storage tank that stores the lubricating oil on the other side in the axial direction with respect to the stator core, a communication passage is provided in the housing to communicate the first storage tank with the second storage tank, the communication passage, as seen in the axial direction, extends above an oil level of the lubricating oil stored in the first storage tank and the second storage tank such that the communication passage provides an air flow between an upper portion of the first storage tank and an upper portion of the second storage tank, and the communication passage is entirely disposed below the rotor shaft in a height direction of the electric motor.

2. The electric motor according to claim 1, wherein the electric motor is mounted in a vehicle and the communication passage extends in the right and left direction on the front side of the vehicle.

3. An electric motor comprising:
a housing having a motor chamber which has an axial direction;
a rotor rotatably provided in the motor chamber and having a rotational axis substantially parallel to the axial direction;
a stator having a stator core provided coaxially with the rotor to surround the rotor;
a rotor shaft provided coaxially with and surrounded by the stator;
a storage tank provided at a lower portion of the housing to store lubricating oil and divided by the stator core into a first storage tank and a second storage tank; and
a communication passage provided in the housing to communicate the first storage tank with the second storage tank, the communication passage, as seen in the axial direction, extending above an oil level of the lubricating oil stored in the first storage tank and the second storage tank such that the communication passage provides an air flow between an upper portion of the first storage tank and an upper portion of the second storage tank, the communication passage is entirely disposed below the rotor shaft in a height direction of the electric motor.

4. The electric motor according to claim 3, wherein the electric motor is mounted in a vehicle and the communication passage extends in a right and left direction on a front side of the vehicle.

5. The electric motor according to claim 3, wherein the housing includes an annular inner periphery as seen in the axial direction, and
wherein the communication passage is provided to penetrate the annular inner periphery as seen in the axial direction.

6. The electric motor according to claim 5, wherein the communication passage has an arc shape as seen in the axial direction.

7. The electric motor according to claim 1, wherein the communication passage, the first storage tank, and the second storage tank are continuous and form a substantially U-shape as seen from above.

8. The electric motor according to claim 1, wherein the communication passage extends below the oil level of the lubricating oil stored in the first storage tank and the second storage tank, the communication passage providing communication between the first storage tank and the second storage tank in the axial direction.

9. The electric motor according to claim 3, wherein the communication passage, the first storage tank, and the second storage tank are continuous and form a substantially U-shape as seen from above.

10. The electric motor according to claim 3, wherein the communication passage extends below the oil level of the lubricating oil stored in the first storage tank and the second storage tank, the communication passage providing communication between the first storage tank and the second storage tank in the axial direction.

11. The electric motor according to claim 1, wherein the communication passage extends partially below the oil level of the lubricating oil stored in the first storage tank and the second storage tank and partially above the oil level of the lubricating oil stored in the first storage tank and the second storage tank such that the communication passage provides an oil flow between the first storage tank and the second storage tank and the air flow between the upper portion of the first storage tank and the upper portion of the second storage tank.

12. The electric motor according to claim 3, wherein the communication passage extends partially below the oil level of the lubricating oil stored in the first storage tank and the second storage tank and partially above the oil level of the lubricating oil stored in the first storage tank and the second storage tank such that the communication passage provides an oil flow between the first storage tank and the second storage tank and the air flow between the upper portion of the first storage tank and the upper portion of the second storage tank.

13. The electric motor according to claim 1, wherein the communication passage extends continuously in a direction parallel to a rotational axis of the rotor shaft from the first storage tank to the second storage tank.

14. The electric motor according to claim 1, wherein an upper end of the communication passage is disposed below the rotor shaft in the height direction of the electric motor and overlaps the stator in a direction that is orthogonal to the axial direction and the height direction.

15. The electric motor according to claim 3, wherein the communication passage extends continuously in a direction parallel to the rotational axis of the rotor shaft from the first storage tank to the second storage tank.

16. The electric motor according to claim 3, wherein an upper end of the communication passage is disposed below the rotor shaft in the height direction of the electric motor and overlaps the stator in a direction that is orthogonal to the axial direction and the height direction.

* * * * *